United States Patent [19]
Schraut

[11] 3,783,592
[45] Jan. 8, 1974

[54] GARDEN GROOMING MACHINE AND ROTOR THEREFOR

[76] Inventor: Karl Schraut, 5431 E. Sussex, Fresno, Calif. 93727

[22] Filed: May 6, 1970

[21] Appl. No.: 35,069

[52] U.S. Cl............ 56/13.3, 56/2, 56/16.9, 56/249.5, 56/DIG. 9
[51] Int. Cl............................................. A01d 87/10
[58] Field of Search................. 56/156, 13.3, 249, 56/249.5, 2, 16.9, DIG. 9; 415/130, 132; 416/182, 183, 185

[56] References Cited
UNITED STATES PATENTS

| | | | |
|---|---|---|---|
| 918,559 | 4/1909 | Landis | 416/185 |
| 3,430,421 | 3/1969 | Matthews | 56/16.9 |
| 2,283,161 | 5/1942 | Booton | 56/249.5 |
| 1,683,183 | 9/1928 | Herr | 56/13.2 |
| 2,700,863 | 2/1955 | Etem | 56/13.3 |
| 3,512,345 | 5/1970 | Smint | 56/16.9 |
| 3,475,887 | 11/1969 | Price | 56/13.3 |
| 3,094,830 | 6/1963 | Leblanc | 56/13.3 |
| 3,058,284 | 10/1962 | Anderson | 56/13.3 |
| 2,920,435 | 1/1960 | Vallone | 56/13.3 |

Primary Examiner—Louis G. Mancène
Assistant Examiner—D. L. Weinhold
Attorney—Schapp and Hatch

[57] ABSTRACT

A self-propelled lawn vacuum, mower and sweeper having interchangeable reel-type mower and rotary brush units, both feeding material tangentially toward the intake of the vacuum. The drive wheels are spring-loaded to follow the ground contour, and the height of the interchangeable units with respect to the vacuum is adjustable. A moveable shutter is interposed between the mower and brush units and the vacuum intake to regulate air flow. The prime mover drives an axial-intake fan having an unusual rotor design, with two pairs of diametrically opposed blades perpendicular to the back plate, each of the pairs being tangent to its own circle concentric with the shaft of the fan, the two circles being of differing diameters. The radially inner corner of each blade away from the back plate is bevelled.

4 Claims, 7 Drawing Figures

INVENTOR.
KARL SCHRAUT
BY Schapp & Hatch
ATTORNEYS

INVENTOR.
KARL SCHRAUT
BY Schapp & Hatch
ATTORNEYS

GARDEN GROOMING MACHINE AND ROTOR THEREFOR

BACKGROUND OF THE INVENTION

This invention relates to a GARDEN GROOMING MACHINE AND ROTOR THEREFOR, and more particularly to a combination vacuum sweeper, reel mower and rotary brush machine having an improved fan rotor.

Prior vacuum sweepers have required large prime movers to create sufficient suction for operation, and have also tended to foul the fan rotor on certain types of garden debris. While many horizontal rotary blade mowers have been constructed to blow the clippings into a receiver, they rely on the cutter blade to create the draft. Since such a blade is designed with cutting as the primary object, it is inefficient at air movement, and the suction created is often insufficient for a good vacuum-type pickup of material such as wet leaves from the ground surface.

Rotary horizontal blade mowers also inevitably comminute the material picked up by the action of the blade. While this is often desirable, there are occasions on which such comminution is not wanted. Prior devices have also been of limited effectiveness in the pickup and removal of matted duff from lawns, and in removal of flattened and sticky material from hard surfaces such as concrete.

SUMMARY OF THE INVENTION

The garden grooming machine of the present invention offers in one unitary apparatus the functions of vacuum pickup of debris with or without either mowing or rotary brush sweeping. A rotor having specially offset blades enables the suction fan to create more draft from a relatively small prime mover, while keeping the fan from being fouled by wet, sticky or otherwise difficult debris.

The brush unit and the reel mower unit are interchangeable, so that the unit can either brush or clip, in combination with vacuum pickup with an adjustable suction force. The user can thus have vacuum pickup either alone or with the rotary brushing, without also having the comminution of the reel mower. Since the debris is projected tangentially into the vacuum nozzle by either the reel mower or the rotary brush, pickup efficiency is improved. The increased pickup efficiency permits a degree of lawn grooming not readily feasible before, in that thoroughly matted duff may be brushed up out of lawns and vacuumed away.

Accordingly, it is a principal object of the present invention to provide a garden grooming machine of the character described having ready interchangeability from vacuum alone to mowing to brushing operation.

It is a further principal object of the present invention to provide a garden grooming machine of the character described having increased traction and ground contour-following ability.

Another object of the present invention is to provide a rotor for the suction fan of a garden grooming machine of the character described having increased efficiency of air movement, debris pickup and resistance to clogging.

A further object of the present invention is to provide a garden grooming machine of the character described in which the air flow intake into the suction nozzle from the mower or brush unit may be regulated or closed off entirely.

Further objects and advantages of the present invention will become apparent as the specification progresses, and the new and useful features thereof will be fully defined in the claims attached hereto.

BRIEF DESCRIPTION OF THE DRAWINGS

The preferred form of the present invention is illustrated in the accompanying drawings, forming part of this specification, in which.

Figure 1:
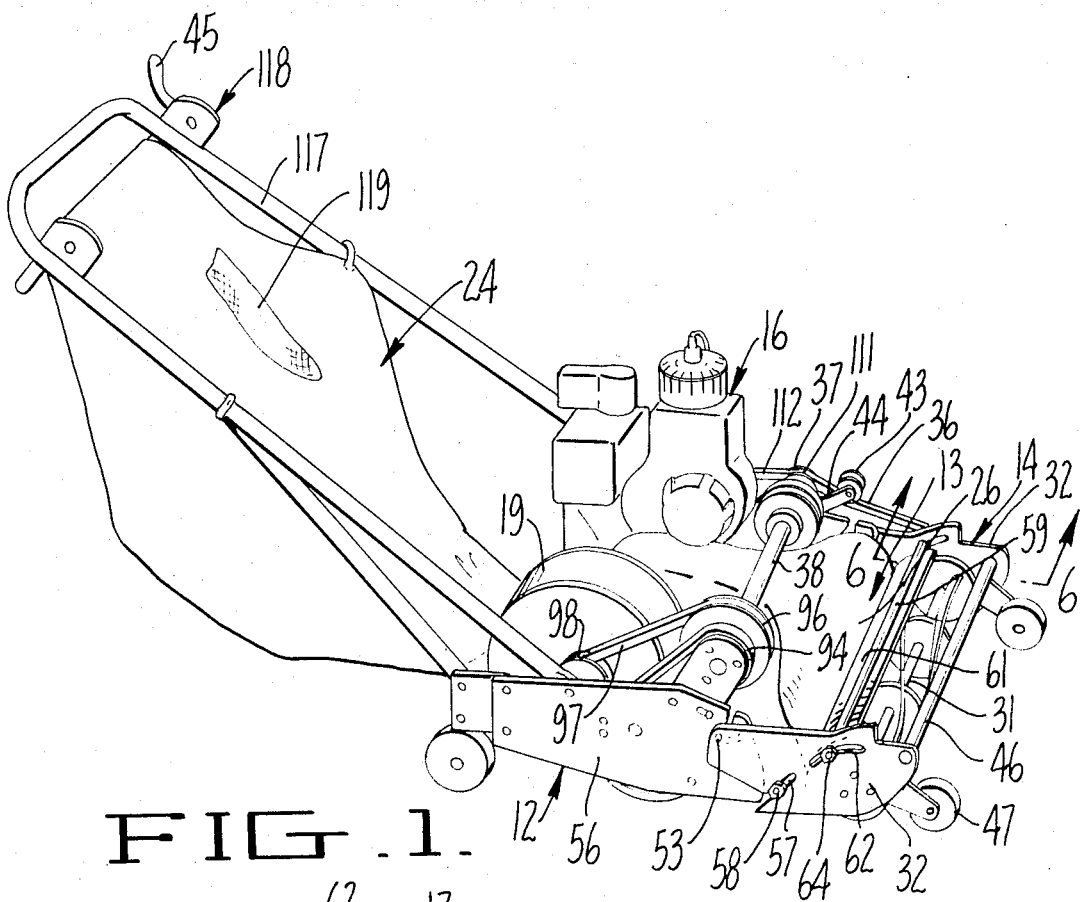
FIG. 1 is a perspective view of the garden grooming machine of the present invention, with the mowing unit attached.

While only the preferred form of the present invention is shown here, it should be understood that various changes or modifications may be made within the scope of the claims attached hereto without departing from the spirit of the invention.

DESCRIPTION OF THE PREFERRED EMBODIMENT

Referring to the drawings in detail, it will be seen that the garden grooming machine 11 of the present invention includes a wheeled chassis 12, a vacuum sweeper 13 for garden materials mounted on the chassis 12, and a reel-type mower 14 mountable on the chassis ahead of the sweeper 13. A prime mover 16 is carried by the chassis 12 and is connectable to the wheels of the chassis, the vacuum sweeper 13, and the reel-type mower 14, for propelling the chassis and operating the vacuum sweeper and the mower. A rotary brush member 17 is also mountable on the chassis 12 in place of the reel-type mower 14, ahead of the vacuum sweeper 13.

The vacuum sweeper 13 has an elongate intake slot 18 disposed near ground level, and generally parallel to the ground surface, after the fashion of the intake nozzle of a conventional domestic vacuum cleaner. The vacuum sweeper also includes a fan rotor 21 journaled for rotation in a generally cylindrical housing 19 on a shaft 22 which passes through one wall of the housing 19. The housing 19 generally surrounds the rotor 21, and has a discharge opening generally indicated at 23. A receiver 24 is connected to the discharge opening 23 to receive and retain the garden materials discharged from the housing. The reciver 24 is constructed of material such as cloth, so that the air blast from the rotor is passed, while the refuse is held. An intake nozzle 26 of generally fan-like shape, with a broader end 27 and of narrower portion 28 has the narrower portion 28 connected to an axial-intake opening 29 in the housing 19. The broader end 27 is located near the ground surface, and has an elongate horizontal aperture therein, serving as the intake slot 18.

Figure 3:
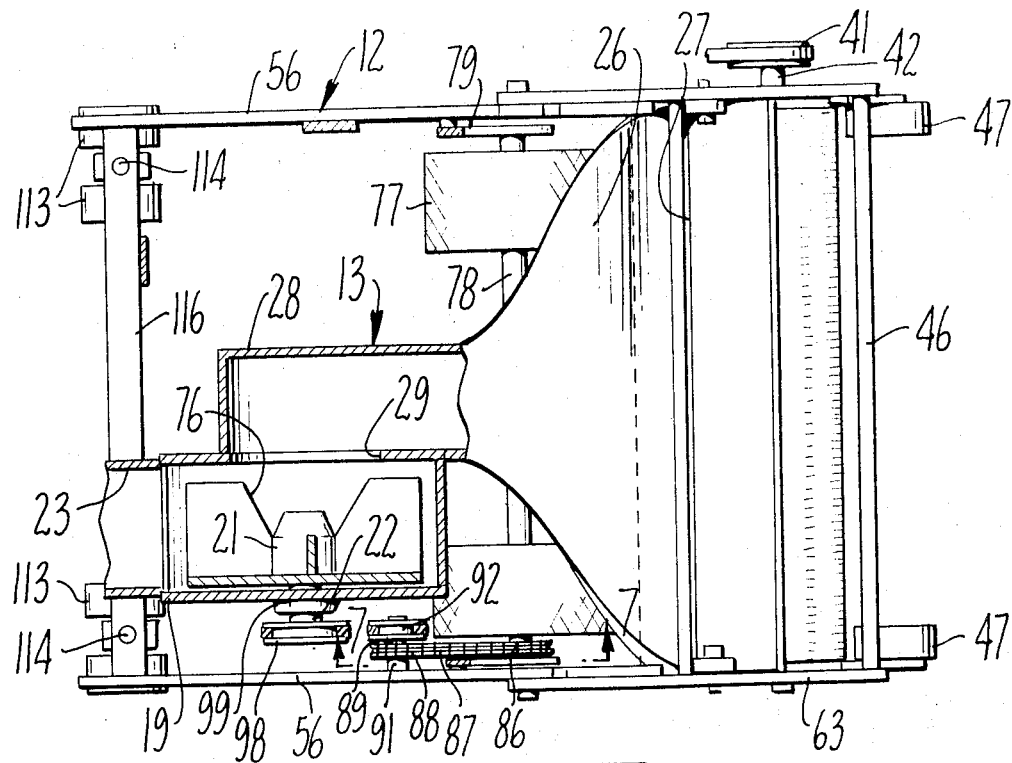
FIG. 3 is a partial cross-section and plan view taken essentially along the plane of lines 3—3 of FIG. 4.
Figure 6:
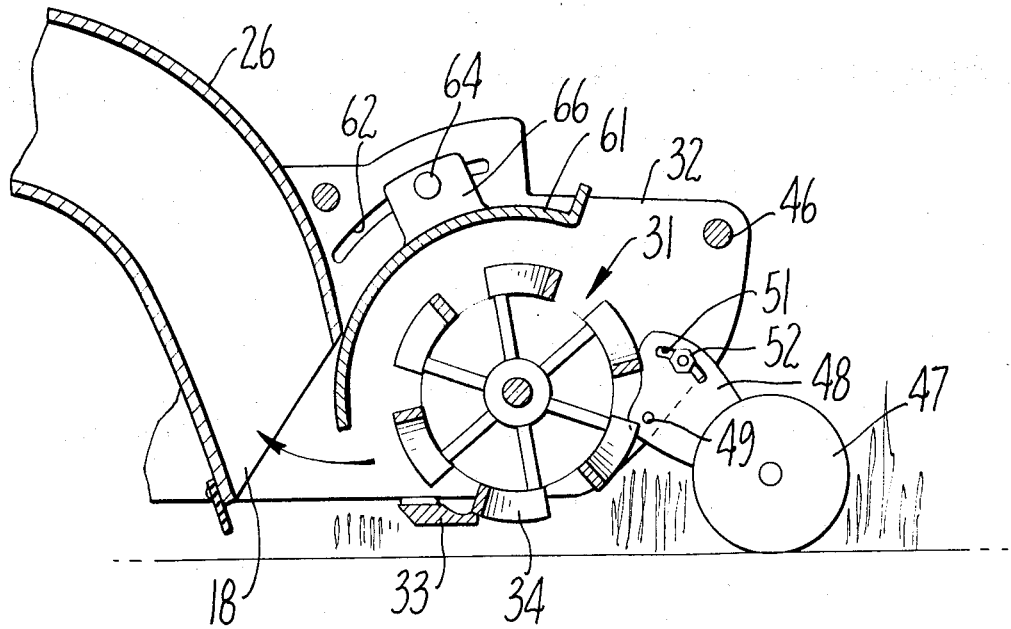
FIG. 6 is a fragmentary cross-sectional view taken approximately along the plane of lines 6—6 of FIG. 1.

The grooming machine 11 is shown in FIG. 1 as set up to mow and vacuum, with the reel-type mower 14 attached. The mower 14 includes a conventional bladed reel 31 journaled in a pair of side plates 32 for rotation about a horizontal axis and a cutter bar 33 carried by the side plates 32 and disposed adjacent the reel 31 to cooperate with the reel in shearing garden materials. The reel 31 and the bar 33 are disposed immediately in front of the intake slot 18 of the vacuum sweeper 13, so that the movement of the blade 34 of the reel 31 toward the bar 33 near the bar 33 is generally in the direction of the intake slot 18, as seen in FIG. 6. Th bladed reel 31 is connected to the prime mover 16 by a flexible belt 36 which passes between a pulley 37 on the countershaft 38 and a pulley 41 (not visible in FIG. 1) attached to the axle 39 of the mower reel 31. The pulley 41 on the axle 39 is essentially similar to the pulley 41 on the axle 42 of the rotary brush member 17 (FIG. 3). An idler wheel 43 rotably mounted on an arm 44, which is in turn adjustably and pivotally mounted on the chassis 12, supplies the adjustment for retention of tension in the belt 36.

The side plates 32 are connected across the front by a crossbar 46, and supported at their lower front ends by wheels 47. The wheels 47 are borne on an adjustable plate member 48 attached to the side plate 32 by a pivot pin 49. The plate member 48 is slotted as shown at 51, and a bolt 52 passes through the slot 51 and is threaded into the side plate 32 to secure the adjustment. The rear end of each of the side plates 32 is equipped with a pivot pin 53 formed here by a bolt. The pin mates with a slot 54 in the side plate 56 of the chassis 12, so that the mower 14 may be removed from the chassis 12 when desired. The angle of the mower 14 with respect to the chassis 12, and hence the height of its cut, may be adjusted by means of a slot 57 in each side plate 32 and a bolt 58 passing through the slot 57 and threaded into the side plate 56 of the chassis 12. The bolt 58 clamps the pivotal motion of the mower 14 about the pivot pin 53. A second crossbar 58 passes between the side plates 32 to add rigidity.

Figure 2:
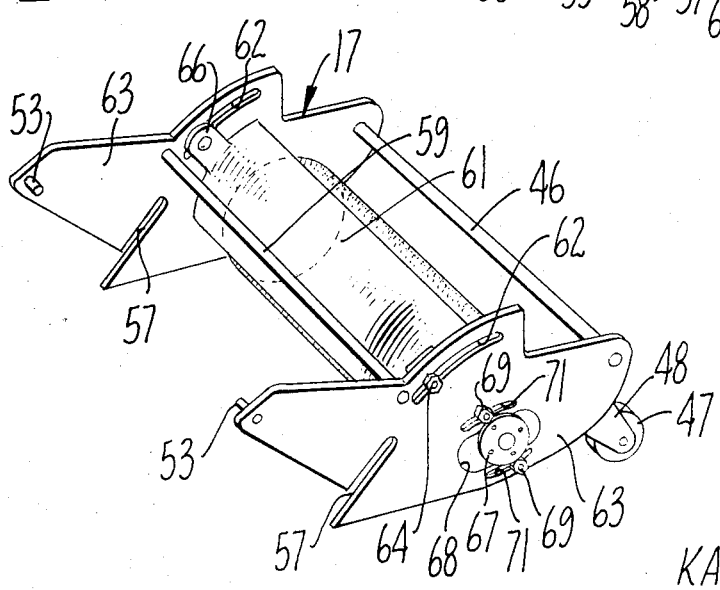
FIG. 2 is a perspective view taken from the rear on an enlarged scale of the brush unit of the present invention.

A shutter member 61 is disposed between the mower 14 and the intake slot 18 to regulate the amount of air passing from the vicinity of the mower 14 into the intake slot 18. The shutter member 61 is formed as a longitudinal section of a circular cylinder, and is oriented with the axis of that cylinder generally coaxial with the axis of the bladed reel 31. Since the shutter member 61 is essentially the same on both the mower unit 14 and the brush unit 17, the description may be taken with respect to both units, and reference made to FIG. 2, which shows the brush member 17, for an understanding of the details of the shutter member 61 in either unit. An arcuate slot 62 is formed in the side plates 32 of the mower 14 and the side plates 63 of the brush unit 17. The shutter member is journaled on the mower unit 14 and the brush unit 17 by a bolt 64 which passes through the slot 62 and into a tab 66 on the shutter member 61. The shutter member 61 is thus constrained to move along a path which represents a portion of the circumference of a circle substantially concentric with the axis of the reel 31 or the axle 42 of the brush unit 17. The bolt 64 may be tightened to clamp the position of the shutter member 61.

The brush unit 17 is essentially similar to the mower unit 14, and similar parts serving the same function are indicated with the same numbers. The axle 42 of the brush is journaled in a bearing plate 67 at each end. The bearing plate 67 passes through an elongate opening 68 in the side plate 63 of the brush unit 17, which allows the bearing plate 67 to be slid back-and-forth, to lower the level of the axle to compensate for bristle wear. The movement of the bearing plate 67 is clamped by bolts 69 passing through slots 71.

Figure 4:
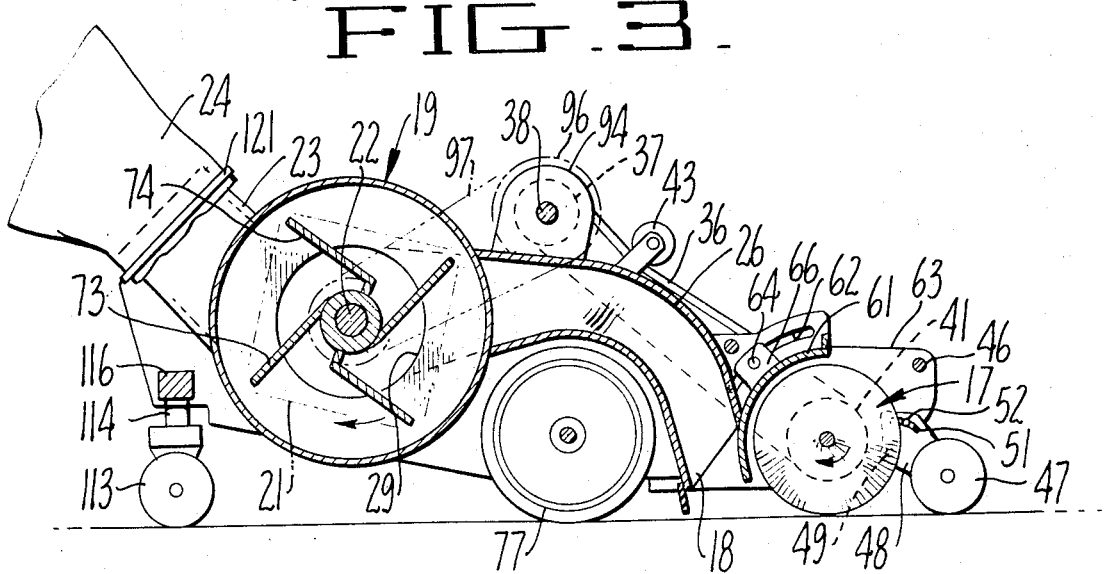
FIG. 4 is a cross-sectional view taken approximately along the plane of lines 4—4 of FIG. 3.

The rotor or impeller 21 is formed with a rotable back plate 72 perpendicular to the shaft 22 about which it is intended to rotate, and as here shown has two pairs of impeller blades, 73 and 74, affixed to the back plate 72. The two blades 73 are attached to the back plate 72 in opposed antiparallel relationship to each other. Each of the pairs of blades 73 and 74 is tangent to a separate circle concentric with the shaft 22, one circle for each pair, with the circles being of differing diameters, as may be seen in FIGS. 4 and 5. The net effect of this configuration is that the radially inner end of each of one pair of blades 73 is spaced farther from the axis of the rotor 21 than the radially inner end of each of the other pair of blades 74.

Figure 5:
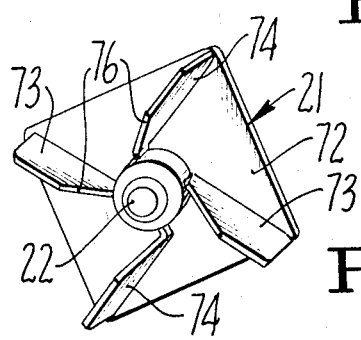
FIG. 5 is a perspective view, on an enlarged scale of the rotor of the present invention.

The blades or vanes 73 and 74 project axially outwardly from the back plate 72, as shown in plan view in FIG. 3 and perspective in FIG. 5, and are generally upstanding from and perpendicular to the back plate 72. As a consequence of the opposed, antiparallel relationship of the vanes in each pair of vanes 73 and 74, it may be seen that the blades or vanes of each pair are tangent to a circle common to that pair but not the other pair, at diametrically opposed points about the circle. The portion of the blade which extends outwardly from the plate 72 is generally rectangular in form, with one corner 76 being bevelled. The bevelled corner 76 is that corner which is radially innermost, and axially farthest from the back plate 72, as may be seen in FIG. 3. The rotor 21 and its housing 19 form an axial intake fan, with an axial intake opening 29 and a tangential discharge 23. Although the mechanism therefor is not completely understood, it is believed that the setting of the blades or vanes 73 tangent to a different circle than the blades or vanes 74 results in a greatly increased efficiency of air movement by the rotor, and superior resistance to clogging by the debris being handled.

Figure 7:
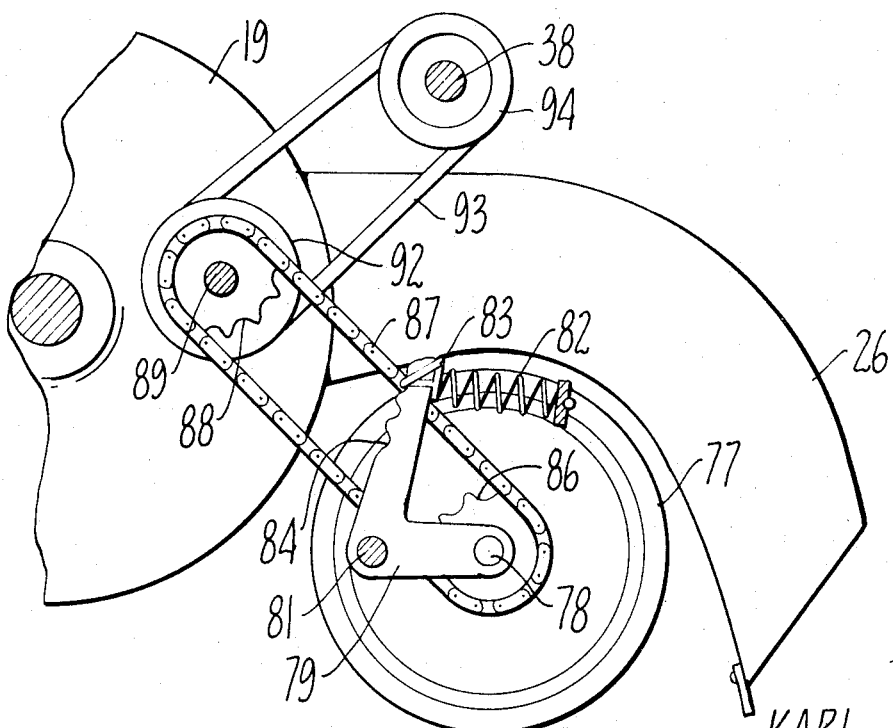
FIG. 7 is a fragmentary cross-sectional view taken approximately along the plane of lines 7—7 of FIG. 3.

A pair of drive wheels 77 of substantial width are borne on an axle 78, which is in turn journaled in bearings (not shown) mounted on a pair of bell cranks 79 (FIG. 7). The bell cranks 79 are pivotally mounted by a pivot pin 81, one to each of the side plates 56 of the chassis 12. The axle 78 is carried by one arm of the bell crank 79, and the other arm of the bell crank 79 is biased by a spring 82 attached to the side plate 56. The attachment of the spring 82 to the bell crank is adjustable along the arm of the bell crank, so that the lever arm acted upon the spring 82 may be changed in length. The attachment is made by a hook member 83 which engages notches 84 in the bell crank 79. The axle 78 is driven by a sprocket 86, which engages a slightly slack drive chain 87. The chain 87 passes at its other end around a sprocket 88 borne by a short shaft 89 journaled in a bearing 91 mounted on the side plate 56. The shaft 89 also bears a pulley 92, from which a drive belt 98 extends to a pulley 94 on the countershaft 38.

A second pulley 96 on the countershaft 38 drives a belt 97 which passes around a pulley 98 on the shaft 22 to drive the fan rotor 21. A bearing 99 in the wall of the housing 19 journals the shaft 22. At the opposite end of the countershaft 38, the end to which the pulley 37 is attached, a pulley 111 entrains a drive belt 112 leading to the pulley (not shown) on the drive shaft of the prime mover 16. The prime mover is here shown as a small gasoline engine of the order of 3 to 5 horsepower, although it should be appreciated that electric motors would also be usable. The horsepower range should be that appropriate to the size of the garden grooming machine 11, 3 horsepower having proven satisfactory in a prototype machine.

The mower and brush units may be readily interchanged on the chassis 12. To remove either unit, the lever 45 is operated to move the arm 44 clockwise as seen in FIG. 1 about its pivotal connection to the chassis 12, to slacken the drive belt 36. The drive belt 36 is then slipped off the pulley 41, and the bolts 58 loosened on either side of the mower or brush unit. The mower or brush unit may then be lifted off by disengaging the pivot pin 53 from the slot 54. Reversing the order of these steps, the other unit may be installed in its place. When vacuum sweeper action alone is desired, without either mowing or brushing, the drive belt 36 may be slightly slackened by operating lever 45 to cause the arm 44 to ease away from the belt 36. The slack belt 36 then no longer drives the pulley 41. The mower or brush unit is left in place so that the shutter member 61 may be closed down entirely (i.e., fully counterclockwise,) to direct the vacuum pickup stream entirely to the ground surface.

Two important advantages result from the action and location of the shutter member 61. The ability to close it entirely, as shown in phantom in FIG. 6, permits use of the machine 11 as a vacuum sweeper alone, when that action is desired, without any diminution of suction by air flow from the mower unit 14 or the brush unit 17. With the shutter member 61 fully closed against the cutter bar or bed knife 33, it will be noted from FIG. 6 that the side of the shutter member 61 facing the intake slot 18 operates as a curved lead-in to the nozzle 26. It is believed that the curved lead-in causes debris to become airborne more readily and rapidly, as compared to a vertical front wall for the nozzle 26. With the shutter member 61 partially or totally open to divert a portion of the incoming air stream through the mower unit 14, an additional advantage is found, in that the incoming air stream tends to pull even the taller grasses into the mower unit and thereby prevents the grass from being beaten down rather than being cut.

The rear end of the chassis 12 (to the left side as shown here) is equipped with a pair of castering wheels 113 borne in swivel mountings 114 attached to a cross member 116 which passes between the side plates 56. The castering action of the wheels 113 adds maneuverability to what would otherwise be a slightly awkward machine. A handle 117 is attached near the rear of the chassis 12 for guiding the machine and to bear the controls (generally indicated as 118), and support the receiver 24. The receiver 24 may have a zipper opening, generally indicated at 119, for removal of garden debris, and is secured at its lower end to the discharge opening 23 by a clamping band member 121, which may be an elastic band member, spring or other suitable cinching device.

From the foregoing, it may b seen that a garden grooming machine has been provided having ready interchangeability from mowing to brushing operation, regulatable air flow from the mower or brush unit into the suction nozzle, and an improved rotor design having greater efficiency of air movement and improved resistance to clogging. The spring-loaded drive wheels provide increased traction and ground-following ability for the machine.

I claim:
1. A garden grooming machine, comprising
   a wheeled chassis,
   a vacuum sweeper for garden materials mounted on said chassis and having an elongate intake slot disposed adjacent and generally parallel to ground level,
   a reel-type lawn mower mountable on said chassis adjacent to and ahead of said intake slot for projecting material clipped by said mower tangentially toward said slot,
   a prime mover mounted on said chassis and connectable to said sweeper, said mower and the wheels of said chassis for propelling same, said mower being demountable from said chassis, and
   a rotary brush member mountable on said chassis in place of said mower and connectable to said prime mover for rotation thereby, so that material swept from the ground surface is projected tangentially of said brush member toward said intake slot.

2. A garden grooming machine, comprising
   a wheeled chassis,
   a vacuum sweeper for garden materials mounted on said chassis and having an elongate intake slot disposed adjacent and generally parallel to ground level,
   a reel-type lawn mower mountable on said chassis adjacent to and ahead of said intake slot for projecting material clipped by said mower tangentially toward said slot,
   a prime mover mounted on said chassis and connectable to said sweeper, said mower and the wheels of said chassis for propelling same, and
   a shutter member disposed between said mower and said intake slot adapted to regulate the amount of air passing from the vicinity of said mower into said intak slot.

3. A garden grooming machine as described in claim 1 and wherein said shutter member comprises a longitudinal section of a circular cylinder oriented with the axis of the cylinder generally coaxial with the axis of the reel of said mower, said shutter member being journaled on said mower for movement along the path of a portion of the circumference of a circle substantially concentric with the axis of the reel of said mower.

4. A garden grooming machine as described in claim 1 and wherein the elevation of said brush member with respect to said chassis is adjustable.

* * * * *